United States Patent
Nicolas et al.

(10) Patent No.: US 6,909,420 B1
(45) Date of Patent: Jun. 21, 2005

(54) DEVICE INDICATING MOVEMENTS FOR SOFTWARE

(76) Inventors: Frédéric Nicolas, 25, rue de l'Echaudey, Moret-sur-Loing (FR), 77250; Fabien Hermand, 16, rue Geoffroy-Marie, Paris (FR), 75009; Jean Bonnard, 42 bis, rue des Cascades, Paris (FR), 75020

( * ) Notice: Subject to any disclaimer, the term of this patent is extended or adjusted under 35 U.S.C. 154(b) by 0 days.

(21) Appl. No.: 09/856,164
(22) PCT Filed: Dec. 2, 1999
(86) PCT No.: PCT/FR99/02991
§ 371 (c)(1),
(2), (4) Date: Nov. 13, 2001
(87) PCT Pub. No.: WO00/33168
PCT Pub. Date: Jun. 8, 2000

(30) Foreign Application Priority Data

Dec. 3, 1998 (FR) .......................................... 98 15266

(51) Int. Cl.⁷ ............................................... G09C 5/08
(52) U.S. Cl. ........................ 345/156; 345/158; 345/181; 463/4
(58) Field of Search ................................. 345/156, 158, 345/161; 463/4, 8, 36

(56) References Cited

U.S. PATENT DOCUMENTS

| 4,414,537 A | | 11/1983 | Grimes ................... 340/365 R |
| 5,005,460 A | * | 4/1991 | Suzuki et al. ................. 84/600 |
| 5,229,756 A | | 7/1993 | Kosugi et al. .............. 340/706 |
| 5,290,964 A | | 3/1994 | Hiyoshi et al. ............... 84/600 |
| 5,444,462 A | | 8/1995 | Wambach ................... 345/158 |
| 5,490,784 A | | 2/1996 | Carmein ..................... 434/55 |
| 5,826,578 A | * | 10/1998 | Curchod ..................... 600/595 |
| 6,030,290 A | * | 2/2000 | Powell ........................ 463/36 |

* cited by examiner

Primary Examiner—Jimmy H. Nguyen
(74) Attorney, Agent, or Firm—Jacobson Holman PLLC

(57) ABSTRACT

A system for transforming the movements of at least one joint of a user into control signals for a computer. The system includes a sleeve for putting on over the joint and a movement sensor fixed to the sleeve for the sensor to be placed and held in the hollow of the joint. The sensor is an on/off sensor that is directly subject to the movements of the sleeve in the hollow of the joint.

15 Claims, 6 Drawing Sheets

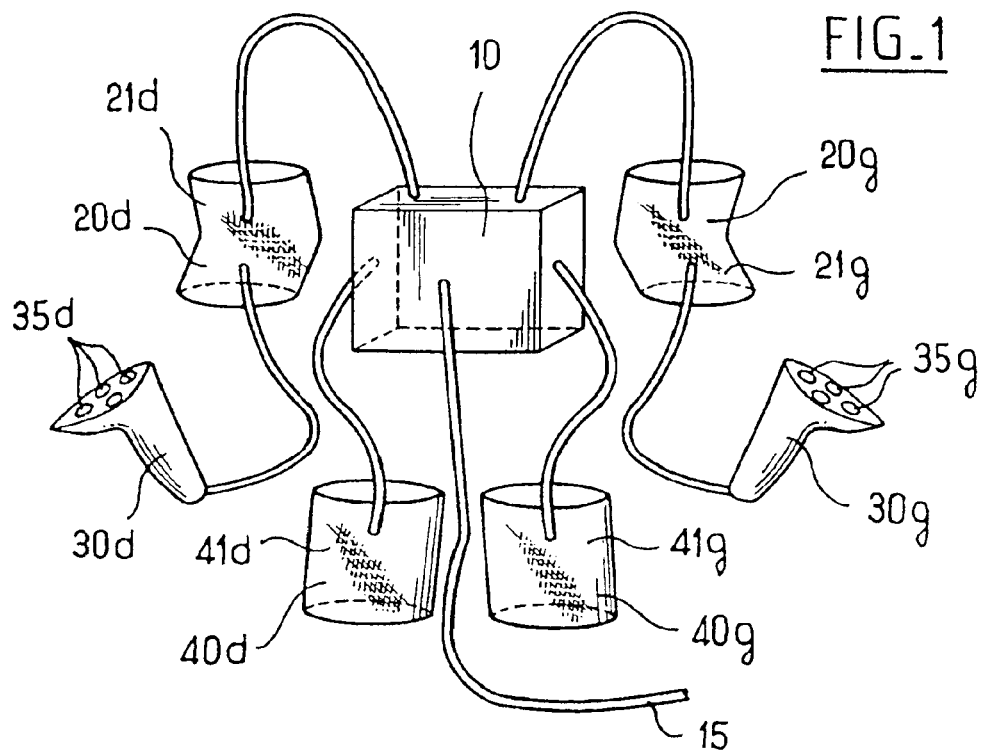
FIG_1
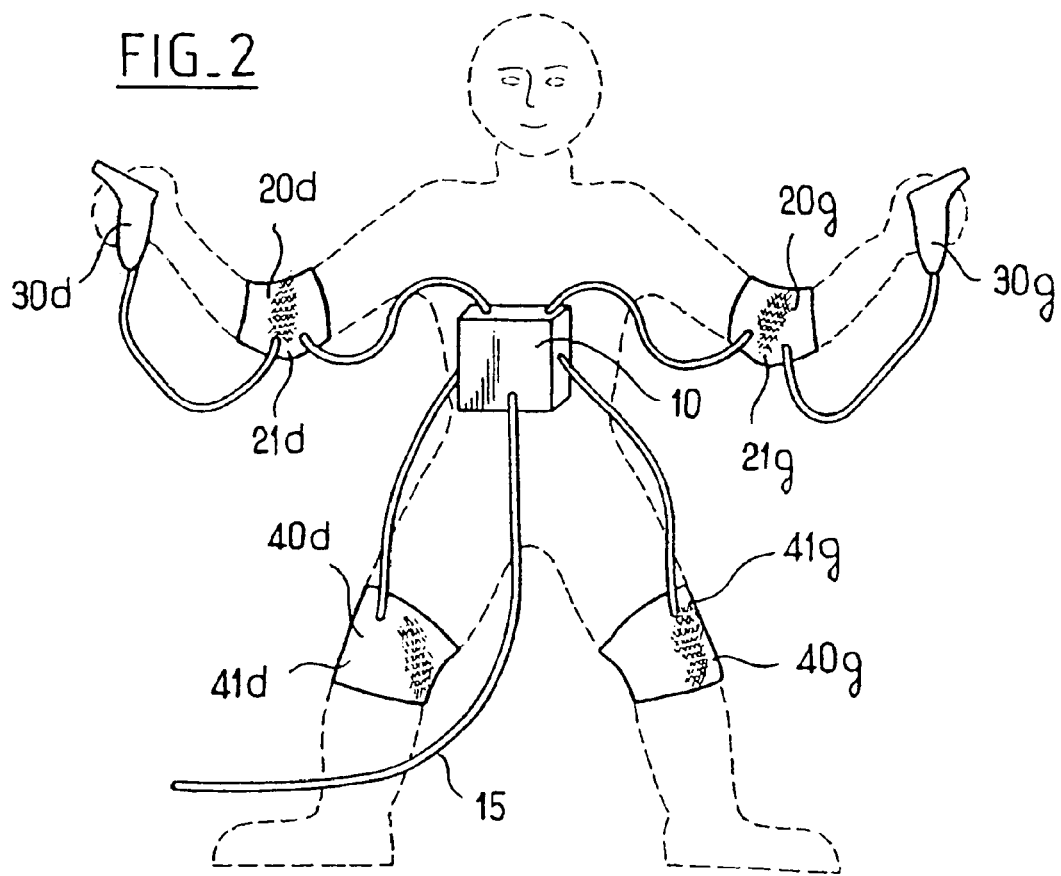
FIG_2

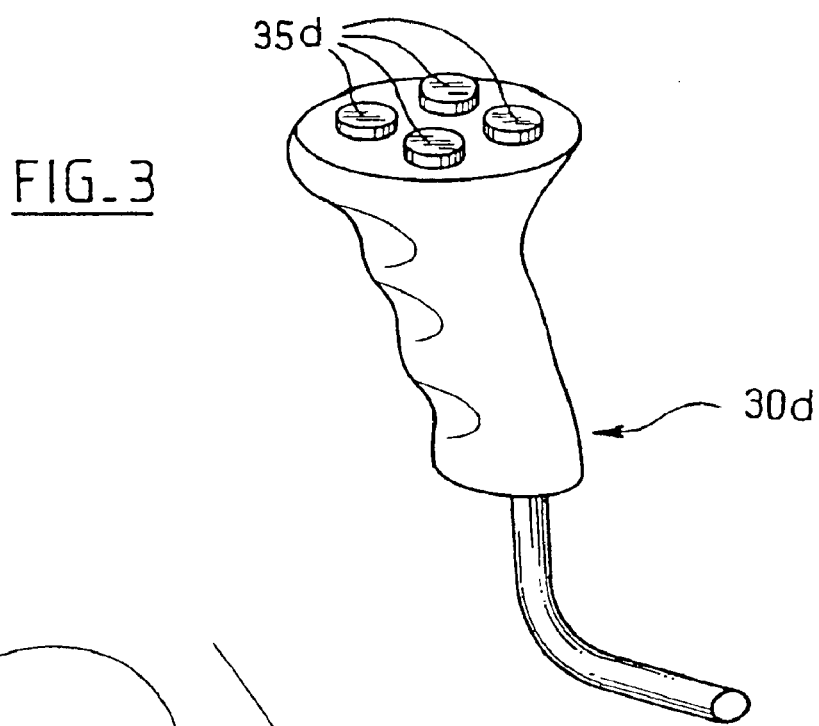
FIG_3
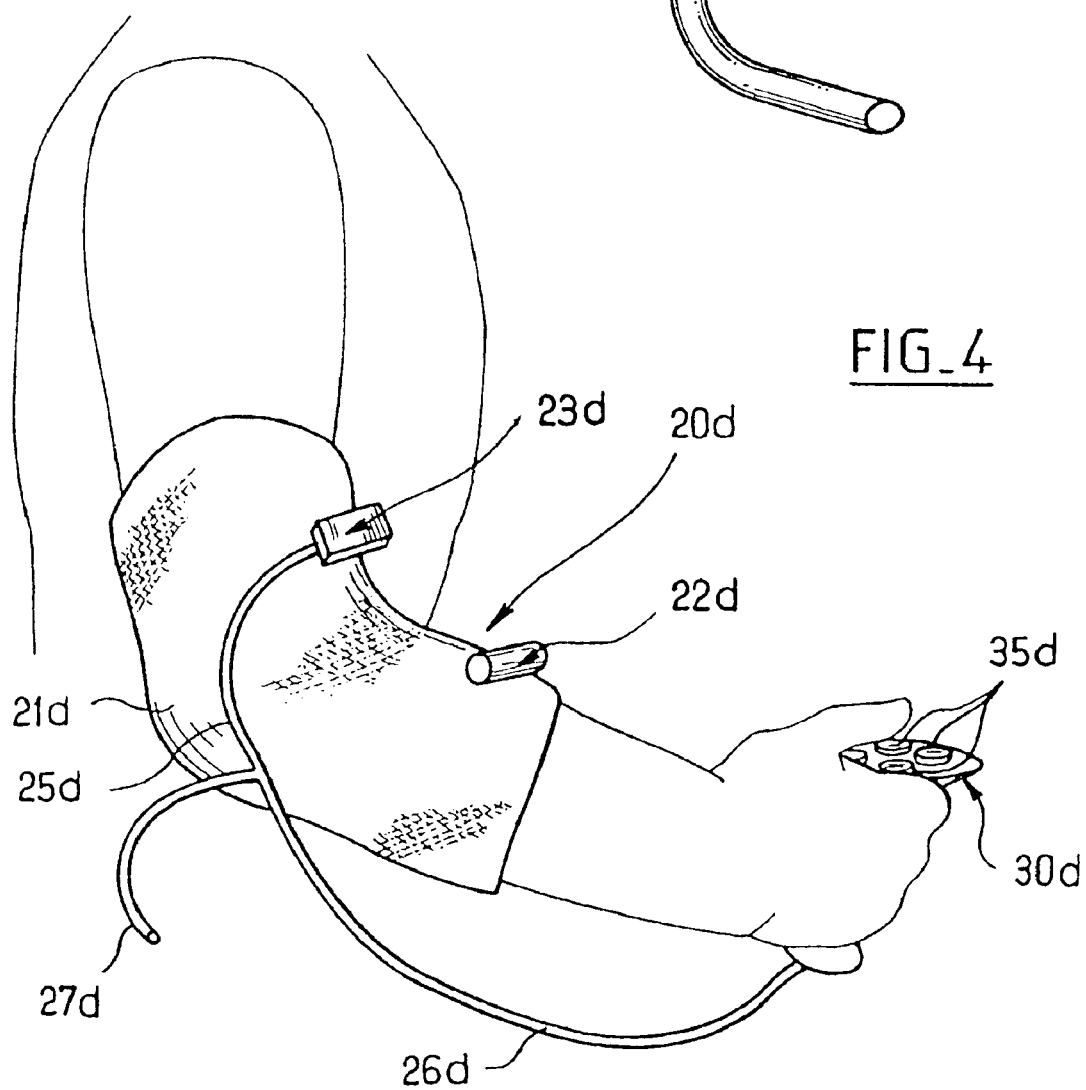
FIG_4

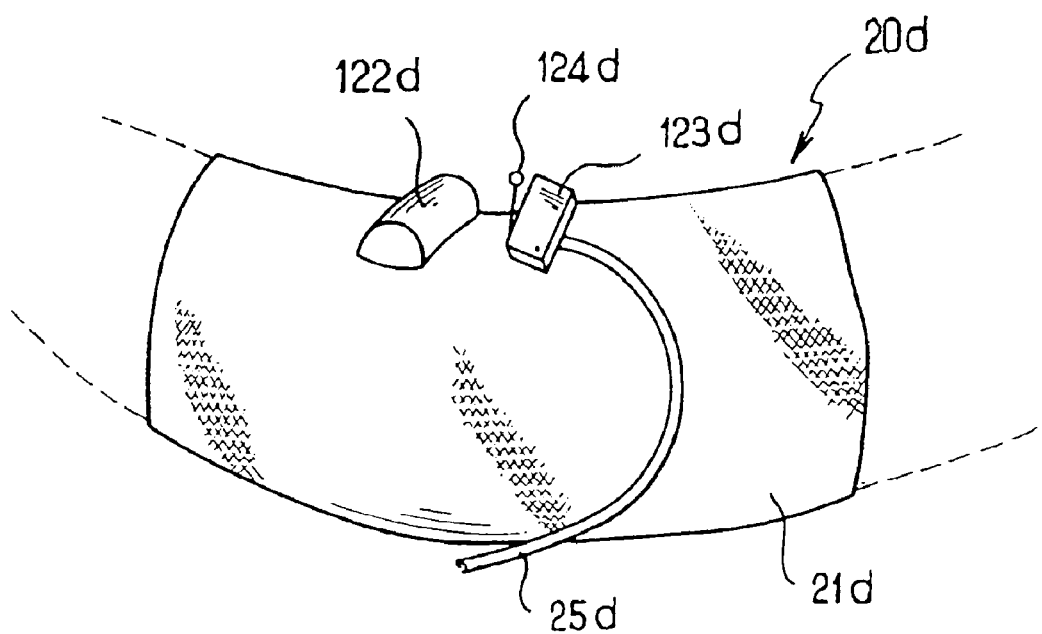
FIG_5
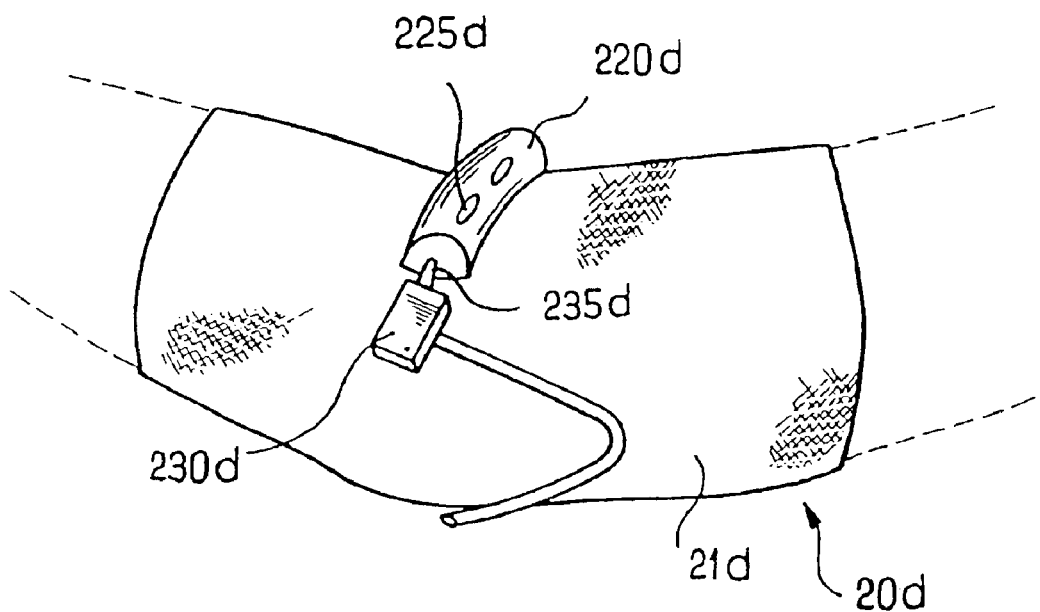
FIG_6

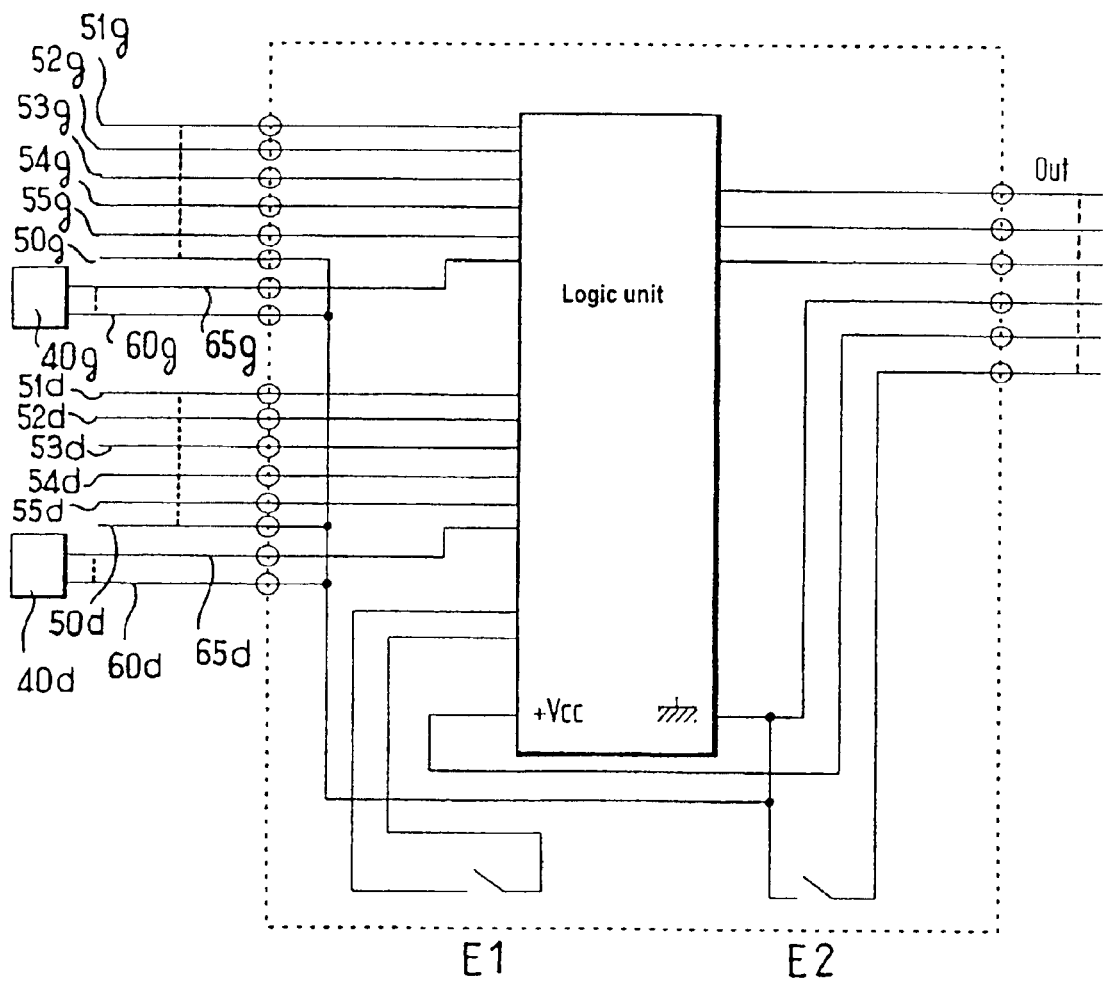
FIG_8

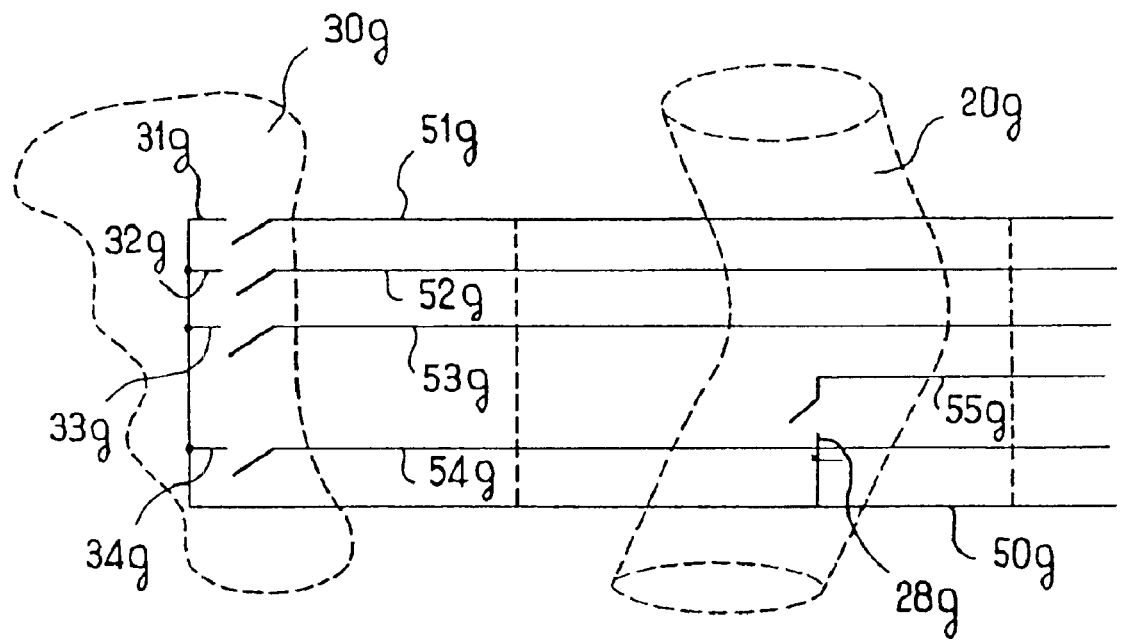
FIG_9
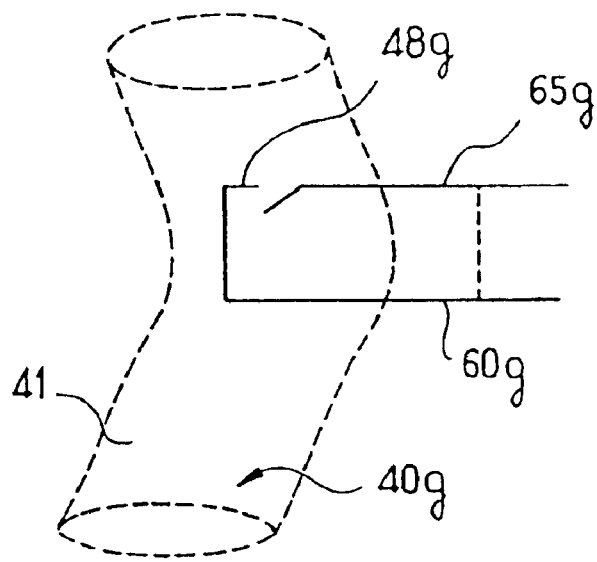
FIG_10

DEVICE INDICATING MOVEMENTS FOR SOFTWARE

BACKGROUND OF THE INVENTION

1. Field of the Invention

The invention relates to software control means constituting sensors for sensing the movement of a part of a user's body.

2. Description of the Related Art

Such control means conventionally include elements which reproduce a control or guide element (a joystick, a steering wheel, control pedals) and elements which are fixed to the body of a user (e.g. the arms or the hands) and that are designed to sense movements while impeding them as little as possible.

Thus, document U.S. Pat. No. 5,229,756 proposes a boxing fight simulator in which the user is fitted with elbow-bend sensors each fixed on a sleeve to measure the bend angle of an elbow and deliver an analog signal representative of said angle, which analog signal is subsequently converted into a digital signal for storing and processing.

That type of apparatus suffers from a major drawback.

The signal delivered by the sensor must be processed by a converter and by a computer, both requiring large computation and memory capacity.

SUMMARY OF THE INVENTION

In practice, that type of apparatus is used only with hardware and software specially designed for such an application because of the high requirements inherent to such sensors.

The main object of the invention is to propose apparatus which is suitable for transforming the position or displacement of a user's limb into a control signal which is significantly representative of said position or displacement, while requiring little by way of computation and memory capacity.

A second object of the invention is to propose such apparatus using movement sensors that are compact and not expensive to make.

According to the invention, these objects are achieved by a system for transforming the movements of at least one joint of a user selected from the group constituted by the knee, the elbow, the shoulder, the hip, or the ankle, into control signals for a computer, the system comprising a sleeve for putting on over the joint and a movement sensor fixed to the sleeve, the apparatus being characterized in that the sensor is an on/off sensor and is directly subject to the movements of the walls of the sleeve.

BRIEF DESCRIPTION OF THE DRAWINGS

The present apparatus makes it possible to use body movement sensors with home type games consoles or with a personal computer, e.g. running existing video games.

Other objects, characteristics, and advantages of the invention will appear on reading the following detailed description given with reference to the accompanying figures, in which:

FIG. 1 is a diagram of apparatus of the invention without the user;

FIG. 2 shows the same apparatus, in place on a user;

FIG. 3 shows a games handset;

FIG. 4 shows such a games handset coupled to an elbow-movement sensor of the invention;

FIG. 5 shows a switch movement sensor in another variant of the invention;

FIG. 6 shows an elbow-movement sensor operating on air pressure, constituting another variant of the invention;

FIG. 8 is a block diagram representing the operation of a central processor module for the FIG. 7 apparatus;

FIG. 9 is a diagram showing the operation of a two-part unit constituted by a movement sensor and a control handset for the apparatus of FIGS. 7 and 8; and FIG. 10 is a diagram showing the operation of a knee movement sensor of the apparatus of FIGS. 7 and 8.

DETAILED DESCRIPTION OF THE PREFERRED EMBODIMENTS

Figure 7:
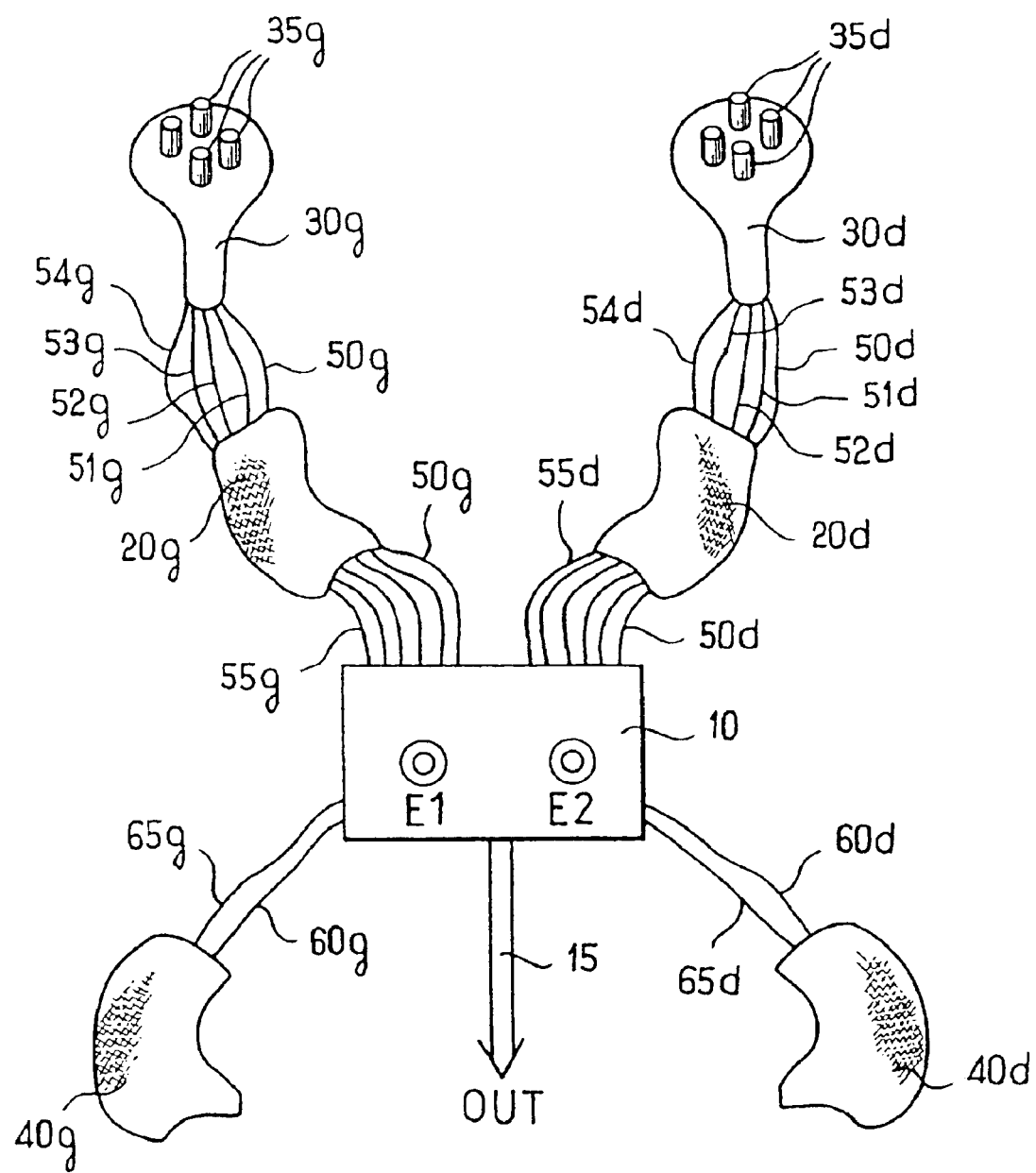
FIG. 7 shows apparatus of the invention in a detailed front view.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The apparatus of FIG. 1 is of star architecture, having a center constituted by a preprocessor module 10 and four branches, constituted by wire connections carrying movement sensors 20*d*, 20*g*, 40*d*, and 40*g*.

In this case, the movement sensors are responsive to knee bending 40*g*, 40*d* and to elbow bending 20*g*, 20*d*.

The two branches, each including an elbow-bending sensor 20*d* and 20*g*, are extended beyond the sensor to a controlling handset 30*d*, 30*g* provided with a pad of pushbuttons 35*g*, 35*d*.

As can be seen in FIG. 2, when a user wears the module 10 on the abdomen, the wire connections run along the user's arms and thighs to the sensors, with the connections between the elbow sensors 20*g*, 20*d* and the handsets 30*g*, 30*d* extending substantially along the forearms, so as to interfere as little as possible with the movements of the user.

When the bending sensors 20*g*, 20*d*, 40*g*, 40*d* or the pushbuttons 35*g*, 35*d* are activated, corresponding signals are passed from these elements to the module 10. The module 10 then processes these signals, after which it sends the processed signals over an outlet connection 15 to a computer (not shown) and it sends them in a format that is acceptable for the computer.

Each bending sensor is mounted on a flexible sleeve 21*d*, 21*g*, 41*d*, 41*g* put on around the joint in question. The sleeve is constituted merely by a strip of cloth.

In FIG. 4, it can be seen that the sleeve 21*d* extends both ways from the elbow around the upper arm and the forearm (and for the knee, the sleeve extends around the thigh and the calf).

The sleeve has portions on the inside of the joint. In particular, on either side of the elbow, it has two inner surfaces which move towards each other or away from each other depending on whether the user bends or straightens the arm.

Advantage is taken of this property by placing a movement sensor on at least one of said two surfaces.

In FIG. 4, two component parts of a Hall effect magnetic sensor are placed on these two surfaces, namely a small magnet 22 on the inside face of the forearm and a receiver part 23 responsive to said magnet on the inside face of the biceps.

The receiver part 23 includes three wires defining two electrical circuits, a first circuit which is open or closed depending on whether the magnet 22 is respectively close to or far away from the part 23, and a second circuit which on the contrary is closed or open depending on whether the magnet 22 is close or far away.

In the present embodiment, a connection 25d having two wires connects the terminals of one of these two circuits to the module 10.

Depending on whether the elbow is bent or not, an electric signal flows or does not flow in the circuit and the connection 25d.

In a variant, the connection 25d has two additional wires connected to the other circuit so as to provide, in addition, complementary information.

The present magnetic movement sensor thus delivers a positive or zero signal depending on whether the joint is bent or straight.

It is thus the position of the joint at a given instant which determines the value of the signal, regardless of whether the joint is stationary or moving at that instant.

In a variant, a movement sensor is used which delivers an on or off signal as a function of the direction in which the joint is moving and not as a function of its actual position.

While the joint is being bent, the sensor takes up a first state, and while the joint is being straightened, the sensor takes up a second state, independently of the degree to which the joint is extended.

Using on/off information supplied by a movement sensor, it is possible to detect bending movement or straightening movement (e.g. a punch or a kick in a combat game) or indeed the extended or bent position (e.g. corresponding to the attitude of a virtual actor, pressures on the pushbutton 35d and 35g triggering displacements or jumps of the actor).

In a variant, the movement sensor shown in FIG. 5 comprises, on the inside surfaces of the joint, on one side a mechanically controlled switch 123, in this case having a lever, and on the other side a piece of foam 122 projecting from the forearm, the switch 123 being actuated by coming into abutment against said piece of foam 122.

In this case, the switch is controlled mechanically by a lever (a lever-operated microswitch), but it could equally well be controlled by a wheel or by a fork.

In a variant of the sensor shown in FIG. 6, a bag of air 220d is placed in the hollow of the elbow, and the pressure therein increases when it is compressed.

A switch 230 is fixed to the sleeve 21d close to the bag 220d, and has a control finger 235 that projects into the bag 220d and that is driven therein like a piston under the effect of the increased pressure.

The bag 220d advantageously has openings 225 allowing air to be expelled from the bag so as to avoid impeding bending movements, these openings being small enough to maintain sufficient extra pressure while the air is being expelled.

The detector is thus responsive to a sudden increase in pressure, i.e. an elbow-bending stage.

The switch 230 can be replaced by a conventional air pressure sensor and the bag can also be made to be hermetically sealed or inflated.

Other on/off sensors can be used for taking advantage of movements of the joint, for example pressure sensors, longitudinal displacement sensors, or radial displacement sensors. The motion sensors can be passive, i.e. they can require external power feeding to them in order to indicate an open or closed position of the joint (or the presence of joint movement in a given direction), or they can be active, i.e. not requiring their own power supply.

The pushbuttons 35d, 35g in the handsets 30g, 30d are situated at the tops of the handset so as to be suitable for being actuated by the thumbs as on the control joysticks commonly used for games consoles.

In this case, wire connections are used as shown in FIG. 4, combining the wires 26d coming from the handset 30d and the wires coming from the elbow sensor 20d, this set of wires going from the forearm to the module 10 in the form of a connection 27d.

FIGS. 7, 8, and 9 show a preferred layout for the various electrical connections between the module 10 and the sensors and handset in the above case where the sensors 20g, 20d, 40g, and 40d are all formed by respective switches 28g, 28d, 48g, 48d.

Each handset 30g and 30d in this case comprises four pushbuttons each corresponding to a respective switch 31g, 32g, 33g, 34g.

A series connection 50g interconnects the module 10, the elbow sensor 20g, and the handset 30g (60g for the knee). By means of this connection, the module 10 delivers a non-zero potential to the sensor 20g, and to the handset 30g. This potential is delivered to one of the terminals of the elbow switch 20g and to one of the terminals of each of the switches in the handset 30g.

Each opposite terminal of each of these five switches is connected via a respective connection 51g, 52g, 53g, 54g, or 55g to the module 10, and the module detects whether or not that connection is returning the potential.

In an ideal arrangement, the four return connections from the handset 30g and the corresponding power supply connection 50g are combined in a single insulating sheath 26g which extends from the handset 30g to the vicinity of the sensor 20g as two branches, one of which is connected to the sensor 20 including a go line and a return line of the connection 50g, and the other of which combines the power and return connections both for the handset 30g and for the sensor 20g.

As shown in FIGS. 8 and 9, the module 10 has two buttons E1 and E2 for starting a video game, for moving in the menu of the game, and for resetting the software.

The module 10 makes use of the on/off information coming from the various sensors and pushbuttons, and calibrates it in a format suitable for the computer located at the other end of the connection 15.

The module 10 itself includes a computer for performing digital pre-processing on the signals that come from the sensors, and for transforming them into data suitable for use by the external computer.

In the present case, the external computer is a games console, and the data output from the module 10 is applied to the inputs of the console normally connected to the joysticks, i.e. a set of contacts themselves designed to receive on/off signals.

For this purpose, such apparatus delivers a signal having the same format as the signals obtained from traditional joystick or pushbutton controls.

The processing performed in this case by the module is particularly simple, and consists merely in transforming a zero or non-zero signal into digital logic levels of predetermined form similar to the logic levels obtained at the outputs from conventional joysticks.

In a variant, the module 10 includes a computer programmed to transform the on/off signals provided by the sensors into information that is specially encoded for a given external computer, and to perform such treatment in various ways that can be selected as a function of the external computer to which the apparatus is connected.

In the present preferred embodiment, the remote computer unit (not shown) generates signals which are sent to the module 10 that responds, after suitable processing, by applying them to mechanical playback members, e.g. pneumatic members fitted to the body, so that the control signals sent to the module 10 are transformed into physical signals applied to the body of the user (a type of biofeedback).

Thus, in the present case, the module 10 and the handsets 30g and 30d are fitted with out-of-balance weights rotated by electric motors to vibrate in order to represent explosions or shooting with certain weapons. Other types of playback (virtual reality helmet, earphones, effect-return harnesses, vibrating seats or boxes, etc.) can also be adopted.

Naturally, numerous variants can be provided by the person skilled in the art in the ambit of the present invention.

For example, the connections between the sensors 20g, 20d, 40g, 40d and the module 10 can be wireless connections.

The module 10 can be placed on the user at some other location, for example on the hip, or indeed can be placed beside the user. Similarly, the connection between the system of the invention and the external computer unit can be by means of a wireless connection.

The movement sensors can be placed on joints other than the elbows or the knees, for example on the shoulder for a sensor that picks up the position of an entire arm or on the hip for a sensor that picks up the position of an entire leg.

In a variant, the system of the invention has additional sensors for picking up the movements of the user's feet, for example, on the ankle joint in order to pick up the stretching action of a kick. In combat video games, the action of stretching out a kick can give rise, for example, to the virtual actor jumping.

Advantageously, the system of the invention has additional sensors in the form of a floor mat comprising foam that includes contacts, making it possible to pick up movements of the user's feet (e.g. the action of moving a foot forward), and convert these movements into virtual movements. In combat video games, the action of moving a foot in front of the body can give rise, for example, to the virtual actor moving forwards.

The external digital processor unit need not be a computer or a console, for example it could be a complete video games machine of the kind to be seen in video gaming arcades, it could be an interactive terminal, etc., with users bringing their own systems of the invention and connecting them directly to the external processor units.

The present apparatus of the invention can then be used equally well at the user's home, in a video gaming arcade, in a bar, at an airport, at a casino, or in any other location, since the system of the invention is easy to transport, and requires no more than an external processor unit capable of receiving and using the signals issued by the system of the invention, which signals are of the same type as the signals issued by the usual controls or joysticks for such an external processor unit.

The types of software for which the present system of the invention is suitable include a very wide range of options, and depending on the needs of the moment, the user can select from this wide range the option that specifically satisfies the user's requests.

Thus, although the following list is not exhaustive, the system of the invention can be used with software for combat games, software for simulating sports in general (basketball, football, golf, skiing, etc.), software for learning movements (gymnastics, swimming, aerobics, boxing, racing, and indeed training in the use of a set of drums, etc.), video conference software, and more generally remote presence software, including over the Internet (animating an avatar), etc. . . . . .

The system of the invention advantageously includes adaptors enabling the various connection means between the module 10 and the external processor unit to be adapted for making connections with various kinds of microcomputer, consoles, and integrated video games machines of the type to be found in games parlors.

The input/output means connecting the module 10 to the external processor are adapted as a function of the type of digital processor on which the software is run, with the types of connection being constituted, for example, by connections of the "joystick" type or of the pushbutton ("pad") type, or of some other type.

The module 10 also has means for adjusting the sensitivity of the signals delivered by the movement sensors, and for giving particular functions to such and such a sensor.

Such apparatus can be used with existing software since the signals output by the apparatus are, in a preferred embodiment, identical to the signals output by the joysticks that are commonly in use, and the signals input to the system of the invention can be processed in a manner analogous to the manner in which they are presently processed by certain joysticks and sensation simulators.

It should be observed that in the example described, all of the standard functions of common joysticks are to be found in the system of the invention.

The system can also be used with software that can be written in the future, secure in the knowledge that widespread use will be possible (because of its compatibility with existing joysticks), while nevertheless providing new modes of use by means of the apparatus of the invention, or indeed with software written specially for the system of the invention (e.g. software for home gymnastics, where the user's movements are picked up, quantized, and assessed by the software, or indeed software enabling users to meet virtually).

The system is compact and easy to transport.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A combination comprising a standard video game equipment capable of displaying varying representations of a human body; and an apparatus for transforming movements of a user into control signals, said apparatus comprising:

a pair of two-state elbow sensors adapted to be positioned in respective elbow regions of the user to deliver two different signals depending on a respective elbow bend;

a pair of two-state knee sensors adapted to be positioned in respective knee regions of the user and to deliver two different signals depending on a respective knee bend;

a processing unit for receiving signals from said elbow and knee sensors and for converting said signals into two-state signals of standard format for generation of game action on said standard video game equipment; and a standard connection arrangement between said apparatus and said standard game equipment;

said apparatus being removably connected to the video game equipment and used as a substitute for a conventional gamepad or joystick to obtain improved playability.

2. The combination according to claim 1, wherein said apparatus further comprises a pair of handsets connected to said processing unit, each handset having at least one pushbutton, said processing unit applying signals representative of actions performed on said pushbuttons to said standard game equipment.

3. The combination according to claim 2, wherein the handset and the elbow sensor adapted to be positioned on the same arm of the user are interconnected by a wire.

4. The combination according to claim 1, wherein said two-state elbow and knee sensors and said processing unit are interconnected by wireless connection.

5. The combination according to claim 1, wherein said two-state elbow and knee sensors are mechanically-controlled switches.

6. The combination according to claim 1, wherein said two-state elbow and knee sensors are positioned in the respective elbow and knee regions by means of sleeves.

7. A video game system including a processor running a game program capable of displaying varying representations of a human body, said system comprising:

a game central processor having an output for a display device and inputs for receiving two-state control signals from conventional gamepads or joysticks; and at least one apparatus for transforming movements of a user into said control signals, said at least one apparatus including, a pair of two-state elbow sensors adapted to be positioned in respective elbow regions of the user to deliver two different signals depending on a respective elbow bend;

a pair of two-state knee sensors adapted to be positioned in respective knee regions of the user and to deliver two different signals depending on a respective knee bend; and a processing unit connected to said sensors for converting signals received from said sensors into said two-state control signals; and a connection between said at least one apparatus and said inputs;

said apparatus being removably connected to said game central processor and used as a substitute for a conventional gamepad or joystick to obtain improved playability.

8. The system according to claim 7, wherein said game program is a combat game program.

9. The system according to claim 7, wherein said apparatus further comprises a pair of handsets connected to said processing unit, each handset having at least one pushbutton, said processing unit applying signals representative of actions performed on said pushbuttons to said game central processor.

10. The system according to claim 9, wherein the handset and the elbow sensor adapted to be positioned on the same arm of the user are interconnected by a wire.

11. The system according to claim 7, wherein said two-state elbow and knee sensors and said processing unit are interconnected by wireless connection.

12. The system according to claim 7, wherein said two-state elbow and knee sensors are mechanically-controlled switches.

13. The system according to claim 7, wherein said two-state elbow and knee sensors are positioned in the respective elbow and knee regions by means of sleeves.

14. A method for controlling a video game program run by a standard game equipment, said game program being capable of displaying varying representations of a human body and said game equipment being capable of receiving two-state signals on game control inputs, from an apparatus being removably connected to the game equipment and used as a substitute for a conventional gamepad or joystick to obtain improved playability the method comprising the steps of:

positioning a pair of two-state elbow sensors of said apparatus in respective elbow regions of the user, each of said elbow sensors delivering one of two different signals depending on a respective elbow bend;

positioning a pair of two-state knee sensors of said apparatus in respective knee regions of the user, each of said knee sensors delivering one of two different signals depending on a respective knee bend;

connecting said two-state elbow and knee sensors to a processing unit of said apparatus;

selectively moving the elbow and/or knee joints, converting said signals received from said sensors into two-state control signals by said processing unit, and applying said two-state control signals to the game equipment; and displaying, with said standard game equipment, representations of the human body corresponding to user movement according to said two-state control signals.

15. The method according to claim 14, wherein said video game program is a combat game program.

* * * * *